Aug. 25, 1970        R. H. McCARTHY        3,525,424
ELECTROMAGNETICALLY RELEASED CALIPER BRAKE
Filed May 3, 1967        2 Sheets-Sheet 2
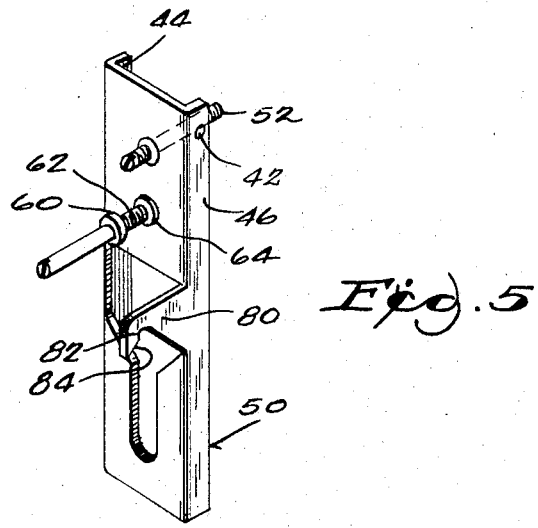
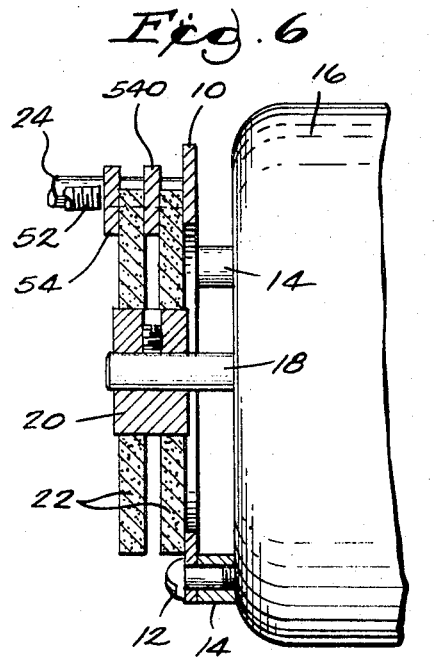
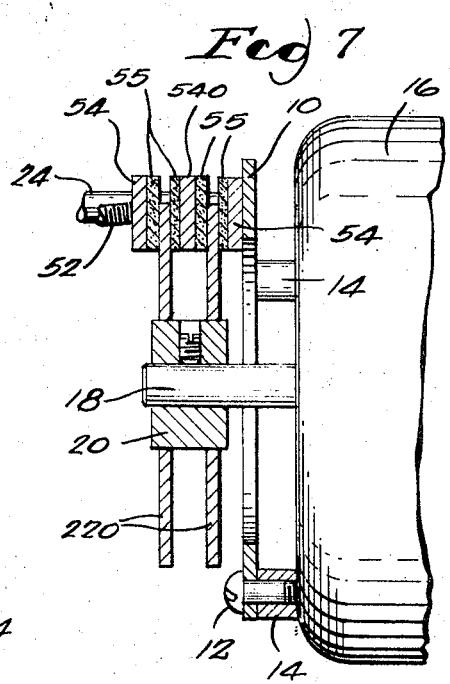
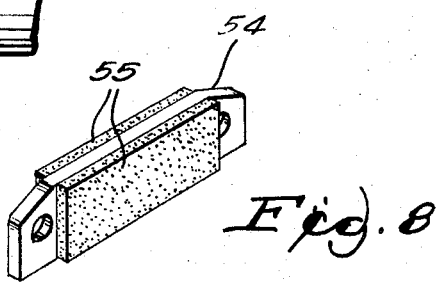
INVENTOR
RICHARD H. McCARTHY
BY Wheeler, Wheeler, House & Clemency
ATTORNEYS

United States Patent Office 3,525,424
Patented Aug. 25, 1970

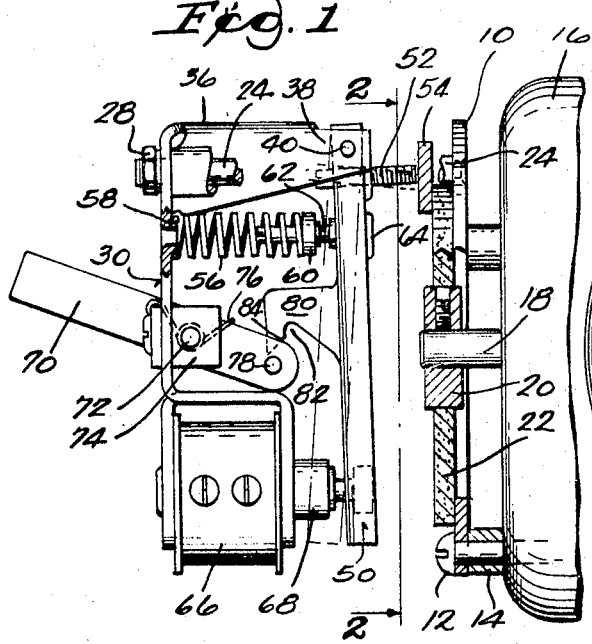

3,525,424
ELECTROMAGNETICALLY RELEASED CALIPER BRAKE
Richard H. McCarthy, Milwaukee, Wis., assignor to Stearns Electric Corporation, Milwaukee, Wis., a corporation of Wisconsin
Filed May 3, 1967, Ser. No. 635,751
Int. Cl. B60t 13/04
U.S. Cl. 188—171      3 Claims

ABSTRACT OF THE DISCLOSURE

Operating parts mounted on a brake plate applicable to the end of a motor include a brake-releasing electromagnet which has an armature connected at the free end of a brake lever in opposition to a brake-applying spring acting on the intermediate portion of said lever to exert thrust on a caliper plate slidable on the mounting arms to and from engagement with a brake disk on the armature shaft.

CROSS REFERENCE

Reference is made to a companion application Ser. No. 455,379, filed May 13, 1965, now Patent No. 3,337,-010, by Bernard E. Wrensch and disclosing a spring-applied magnetically-released caliper brake structure.

SUMMARY OF INVENTION

The entire brake and operating mechanism, excepting only the armature shaft disk upon which the brake operates, is carried by two arms projecting rearwardly from a plate designed for mounting at the end of a motor shell. The arms which project rearwardly from this plate not only support the brake operating lever, spring, and electromagnet but also serve to guide a floating caliper brake member movable toward and from the plate first mentioned to clamp the intervening disk which floats on the armature shaft.

For transmitting thrust to this member, the operating lever has a stud, preferably adjustable, very close to its fulcrum and bearing at its end upon the caliper member. The brake applying spring acts on the lever at a radial distance from the lever fulcrum and has approximately twice the spacing of the stud from the fulcrum, thus having considerable mechanical advantage. However, the electromagnet can be very light because its solenoid type armature is connected with the free end of the lever several times as far from the fulcrum as is the spring.

The frame which mounts the spring and the magnet is also provided with a manually operable brake-releasing member constituting a lever engageable with the beveled end of a hook carried by the brake applying lever, the hook being so notched as to constitute a detent for holding the brake disengaged when the manually operable control lever is fully displaced.

BRIEF DESCRIPTION OF DRAWINGS

FIG. 1 is a view of a brake embodying the invention as it appears partially in side elevation and partially broken away to an axial section.
FIG. 2 is a view taken in transverse section on line 2—2 of FIG. 1.
FIG. 3 is a plan view of the assembly.
FIG. 4 is a view of the assembly in end elevation.
FIG. 5 is a view in perspective of the channel-shaped brake-operating lever and parts fixed thereto.
FIG. 6 is an enlarged detail view in a section comparable to that of FIG. 1, fragmentarily illustrating a modified embodiment of the invention.
FIG. 7 is a view similar to FIG. 6 further illustrating a modified embodiment of the invention.
FIG. 8 is a view in perspective of one of the clutch elements shown in FIG. 7.

DETAILED DESCRIPTION

The annular friction and mounting plate 10 is supported by screws 12 and collars 14 from the motor shell 16 substantially centered with the armature shaft 18. On the armature shaft is a polygonal hub 20 on which floats the brake disk or disks 22 for movement to and from friction engagement with the plate 10.

Posts 24 and 26 fixed to plate 10 and projecting rearwardly therefrom are screwthreaded at their ends to receive the nuts 28. The nuts hold a stamped frame 30 in position upon the posts 24 and 26. Posts 24, 26 may have enlarged portions 32 against which frame 30 seats.

The forwardly projecting portion 36 of the frame 30 provides ears at 38 (FIG. 3) between which extends a pintle 40 passing through appropriate openings such as that shown at 42 in FIG. 5 in the side flanges 44 and 46 of the brake operating lever 50.

Immediately below the pintle 40, lever 50 carries a thrust member 52 in the form of a stud or screw adjustably threaded into the lever and having its free end engaged with a caliper brake plate 54 slidably mounted on the posts 24, 26 (FIGS. 1, 2 and 3). The forward face of plate 54 engages the floating brake disk 22 on the armature shaft to clamp it with caliper action against the fixed brake plate 10. This is accomplished subject to the bias of a compression spring 56 which has a spring seat 58 formed on the frame member 30 (FIG. 1) and has another spring seat 60 comprising a shoulder on an adjusting screw 62 threaded into the brake lever 50 (FIG. 5) and positioned in adjustment by lock nut 64 to regulate the spring pressure.

As hereinafter noted, multiple brake disks and intervening floating plates may be used if desired.

To release the brake, a solenoid or other electromagnet 66 is mounted on the frame and has its armature 68 connected with the brake lever 50 at the free end of said lever (FIG. 1). Means is provided for manually releasing the brake and for detaining it in its released position. The manually operable detent lever 70 is pivotally connected at 72 to a bracket 74 at one side of the frame (FIGS. 1 and 4). It is subject to the bias of spring 76, which tends to oscillate the lever clockwise as viewed in FIG. 1. The pin 78 near the inner end of such lever coacts with an arm 80 (FIGS. 1 and 5). This arm is hook-shaped having a notch at 82 in which the pin 78 is receivable for detent action. The hook has its extremity beveled as shown at 84 so that the pin 78 will cam the brake lever 50 to brake releasing position. In the extreme position of the manually operable detent lever 70, the engagement of pin 78 in notch 82 will hold the brake released.

The various moments of leverage are such that the spring 56 can exert considerable caliper cramping pressure on the brake disk 22 to arrest rotation of the armature shaft except when the magnet 66 is energized. Normally, the magnet will be connected in circuit with the motor so that whenever the motor is in operation the magnet armature 68, acting at the free end of the lever 50, will readily overcome the bias of the spring 56 to release the brake.

It will be noted that the assembly of the frame and the operating mechanism upon the plate 10 is unitary so that the entire brake can be mounted with great facility either upon new motors or existing motors. It is common to design motors to receive face plates such as that shown at 10, since numerous tools are so mounted. Hence no change whatever is required in the motor. The application of the brake structure involves merely the attachment of the hub 20 to the armature shaft (usually by a set screw as shown in FIG. 1) and the screwing to the motor shell of the entire unitary brake assembly for coacting with a disk floating on the hub.

It will further be noted that the brake assembly does not obstruct in any way the access to the mounting shell. The clearance between the operating parts and the plate as shown in FIGS. 1, 2, 3 and 4 is such that everything is accessible.

If desired, the polygonal hub 20 on motor shaft 18 may be dimensioned to receive a plurality of floating disks 22, two such disks being illustrated in FIG. 6. In this event, an intervening brake plate 540 is floated on the posts 24 and 26 and interleaved between the disks 22.

Whereas the disks 22 as illustrated in FIGS. 1 to 6 are made of cork or other friction material, FIG. 7 shows an arrangement in which the disks 220 are metallic and the anti-friction pads 55 are limited to the floating brake plates 54 and 540 and to the fixed plate 10 as shown in FIGS. 7 and 8.

In the modifications shown in FIGS. 6 to 8, the caliper action with which the brake operates is unchanged and is in accordance with the previous description.

I claim:

1. A braking unit comprising, for interaction with at least one brake disk on the armature shaft of an electric motor, the combination with a brake and mounting plate abutting the disk and having means for connecting it with said motor, of spaced studs projecting rearwardly from said plate, at least one caliper brake member reciprocably mounted and guided on said studs for movement to and from said plate for caliper clamping engagement with said disk, a frame mounted on said studs in spaced relation to the disk, a brake lever pivoted to said frame and having a thrust element projecting forwardly into engagement with the caliper brake member, a spring seated on said frame and upon a portion of said lever below said element and biasing said lever in a direction to project said element against the caliper brake member, and an electromagnet on said frame having an armature connected with a free end portion of said lever and adapted on energization of the magnet to urge said lever rearwardly against the bias of said spring for the release of thrust of the caliper brake member, the lever being channel-shaped in cross section and having apertured flanges through which extends a pintle with which the frame is provided, said channel-shaped lever having an intermediate web portion from which immediately beneath the pintle said thrust element projects forwardly into engagement with the caliper brake member.

2. A brake unit according to claim 1 in which the said lever web portion is further provided with an adjustable spring seat, the brake applying spring aforesaid being engaged with said seat, the frame being provided with an opposing seat therefor.

3. A braking unit for interaction with at least one brake disk on the armature shaft of an electric motor, said unit comprising a plate for friction engagement with said disk means mounted on said plate for movement to and from engagement with the disk, a spring biased brake lever provided with an operating spring and constituting means for actuating the brake member toward the disk, and means for manually relieving said brake member from the pressure of the spring biased lever, said last mentioned means comprising a hand lever pivoted to the frame and having a laterally projecting pin, said brake lever having a rearwardly projecting hook with a beveled extremity with which said pin is engageable, said hook having a notch in which the pin seats at limit of movement of the hand lever, said hand lever having a spring biasing it away from its said limit of movement.

References Cited

UNITED STATES PATENTS

| 2,974,756 | 3/1961 | Roehm | 188—171 |
| 3,139,160 | 6/1964 | Hink et al. | 188—171 |
| 3,288,255 | 11/1966 | Palme | 188—171 |

DUANE A. REGER, Primary Examiner

U.S. Cl. X.R.

188—71